US009542619B2

(12) United States Patent
Culpepper et al.

(10) Patent No.: US 9,542,619 B2
(45) Date of Patent: Jan. 10, 2017

(54) AUTOMATIC IMAGE PILING

(71) Applicant: Yahoo! Inc., Sunnyvale, CA (US)

(72) Inventors: Benjamin Jackson Culpepper, Palo Alto, CA (US); Pierre Garrigues, San Francisco, CA (US); Allison Janoch, Berkeley, CA (US); Huy X. Nguyen, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 130 days.

(21) Appl. No.: 13/793,890

(22) Filed: Mar. 11, 2013

(65) Prior Publication Data

US 2014/0254946 A1    Sep. 11, 2014

(51) Int. Cl.
*G06K 9/62*    (2006.01)
*G06K 9/00*    (2006.01)

(52) U.S. Cl.
CPC ......... *G06K 9/6219* (2013.01); *G06K 9/00684* (2013.01)

(58) Field of Classification Search
USPC ........................................................ 382/224
See application file for complete search history.

(56) References Cited

U.S. PATENT DOCUMENTS

| | | | |
|---|---|---|---|
| 7,705,858 B2 * | 4/2010 | Ubillos et al. ................. 345/619 |
| 8,020,110 B2 * | 9/2011 | Hurst ................ G06F 17/30643 |
| | | | 715/762 |
| 8,195,646 B2 * | 6/2012 | Evans .................... G06F 17/301 |
| | | | 707/716 |
| 8,330,844 B2 | 12/2012 | Reid et al. |
| 8,416,265 B2 | 4/2013 | Reid et al. |
| 8,484,206 B2 * | 7/2013 | Schmidt ................. G06Q 10/10 |
| | | | 705/7.11 |
| 2006/0271884 A1 * | 11/2006 | Hurst ................ G06F 17/30716 |
| | | | 715/854 |
| 2008/0150892 A1 | 6/2008 | Duhig et al. |
| 2011/0161174 A1 | 6/2011 | Simms et al. |
| 2011/0170782 A1 | 7/2011 | Iwamoto et al. |
| 2012/0054208 A1 | 3/2012 | Kitamaru |

FOREIGN PATENT DOCUMENTS

KR    10-2006-0076311    7/2006

OTHER PUBLICATIONS

Naaman et al., "Context data in geo-referenced digital photo collections"; Proceeding Multimedia '04 Proceedings of the 12th annual ACM international conference on Multimedia pp. 196-203 ACM New York, NY, USA © 2004.*

(Continued)

*Primary Examiner* — Ishrat I Sherali
(74) *Attorney, Agent, or Firm* — Weaver Austin Villeneuve & Sampson LLP

(57) ABSTRACT

A system for determining piles comprises an interface and a processor. The interface is configured to receive an image. The processor is configured to determine one or more attributes of the image; to determine whether the image is a member of a top of a hierarchy based at least in part on the attributes. In the event it is determined that the image is a member of the top of the hierarchy: determine a set of elements of the hierarchy the image is a member of, based at least in part on the attributes and determine which of the set of entities are piles.

20 Claims, 14 Drawing Sheets

(56) References Cited

OTHER PUBLICATIONS

TW patent application No. 103108098, Office Action mailed Aug. 14, 2015.
Graham, Adrian et al., "Time as essence for photo browsing through personal digital libraries," JCDL '02, Jul. 13-17, 2002.
Grant, Karen D. et al., "Beyond the shoe box: foundations for flexibly orgainizing photographs on a computer," Stanford University, Dec. 24, 2008.
Mander, Richard et al., "A 'pile' metaphor for supporting casual organization of information," May 3-7, 1992, © Apple Computer, Inc.
WO patent application No. PCT/US2014/019563, International Search Report and Written Opinion mailed Jun. 27, 2014.
TW patent application No. 103108098, Notification of Application Approval mailed Apr. 8, 2016.

* cited by examiner

AUTOMATIC IMAGE PILING

BACKGROUND OF THE INVENTION

A common mode of interaction with printed images is to sort a large collection into sub-collections by placing them into piles. Many different sorts of categories can be used, for instance, separating piles by who is in them, by the day they were taken, by the location they were taken, by their predominant color, by the kind of object that features most prominently, or by any other appropriate scheme. A person might desire to organize digital images in the same way. This can be a daunting task for a digital photographer, as it is typical to have a very large number of images in a given collection and a limited size display.

BRIEF DESCRIPTION OF THE DRAWINGS

Various embodiments of the invention are disclosed in the following detailed description and the accompanying drawings.

DETAILED DESCRIPTION

Figure 1:
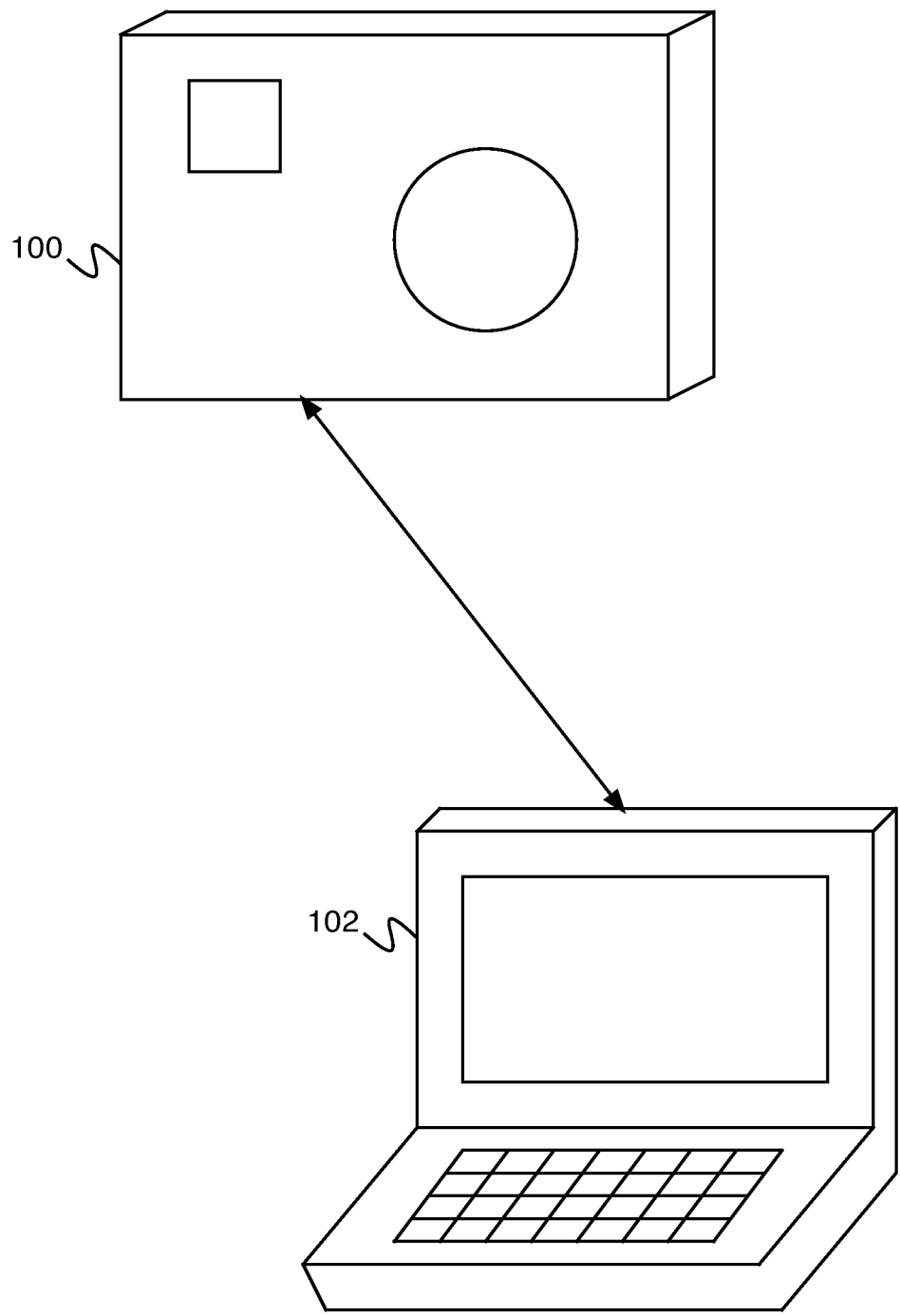
FIG. 1 is a diagram illustrating an embodiment of a system for capturing and classifying images.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic image piling is disclosed. A system for determining piles comprises an interface and a processor. The interface is configured to receive an image. The processor is configured to determine one or more attributes of the image; to determine whether the image is a member of a top of a hierarchy based at least in part on the attributes. In the event it is determined that the image is a member of the top of the hierarchy: determine a set of elements of the hierarchy the image is a member of, based at least in part on the attributes; and determine which of the set of entities are piles.

In some embodiments, a system for determining piles comprises an interface configured to receive an image. The system comprises a memory for storing an ontology. The system comprises a processor configured to determine one or more attributes of an image; determine whether the image is a member of an entity in the ontology based at least in part on the attributes; in the event it is determined that the image is a member of a parent entity in the ontology: determine the set of child entities of the ontology the image is a member of, based at least in part on the attributes; and determine which of the set of entities are piles; and a memory coupled to the processor and configured to provide the processor with instructions. A memory also stores the image.

In some embodiments, an ontology is made up of "instances", "classes", "attributes", and "relations". Instances and classes are nodes in a directed, acyclic graph (DAG) with a root node "object". The edges in this graph are "is a" relations; that is, if node "car" is a child of "object" (and "object" is a parent of "car"), and "1993 White Nissan Pathfinder" is a child of "car" (and "car" is a parent of "1993 White Nissan Pathfinder"), then we can infer that both "car" and "1993 White Nissan Pathfinder" are objects and "1993 White Nissan Pathfinder" is a car. Since all nodes are children of "object", an equivalent designation of the same structure omits the root "object" node and is a list of directed acyclic graphs with more specific classes at their root, and this is the notion that is used here. In this case, "car" could be the top of one hierarchy, and more specific cars would be described as children of the "car" root. The leaves of these DAGs are "instances" and the internal nodes are "classes". Attributes are properties or characteristics of objects and classes. Relations are ways that classes and instances can be related to one another. For example, a "car" might have a "has a" relation to "steering wheel", and a "horse" might have a "can be ridden by" relation to "person". The "is a" relations that form the edges of a DAG are a subset of all relations. Other relations may be specified in the same way, but the resulting graph may no longer be acyclic.

A system for automatic image piling is disclosed. The system receives and processes an image and determines which pile or piles the image is a member of In some embodiments, the system receives an image and determines low-level features and high-level attributes of the image. The high-level attributes are then tested against a set of image type hierarchies to determine the image type. Any hierarchy the image is determined to be a member of is further analyzed to determine which elements the image is a member of One or more of the elements which the image is a member of is then selected as a pile for the image, and the pile is updated to include the image. In various embodiments, determining the set of hierarchies to further analyze comprises a best-first search or a beam search, or any other appropriate search. In various embodiments, determining the set of elements of the hierarchy the image is a member of comprises a best-first search or a beam search, or any other appropriate search.

FIG. 1 is a diagram illustrating an embodiment of a system for capturing and classifying images. In the example shown, the system for capturing and classifying images comprises camera 100 and computing device 102. Camera 100 communicates with computing device 102 to transfer digital images—for example, digital images captured by camera 100 for classification by computing device 102. In various embodiments, camera 100 and computing device 102 communicate via a wire, via a wireless connection, via the transfer of a data storage device, or by any other appropriate means. In some embodiments, camera 100 and computing device 102 comprise a hybrid device (e.g., a camera-enabled mobile phone, a camera-enabled desktop computer, a smart phone, or any other appropriate device) and images are communicated internally to the hybrid device. In various embodiments, camera 100 and computing device 102 are remote to one another, and images are received by the computing device via one or more of a network (e.g., a local area network, a wide area network, the Internet, etc.), an external storage device (e.g., an external hard drive, a flash hard drive, etc.), or any other appropriate means. Camera 100 provides a collection of images to computing device 102. In some embodiments, a collection of images stored on computing device 102 comprises images received from more than one camera. Computing device 102 comprises a system for automatic image piling. In some embodiments, computing device 102 comprises a system for determining piles. In some embodiments, the image source (e.g., camera 100, an external storage device, the Internet, etc.) does not affect the image piling process. In some embodiments, the image source is used as an input to the image piling process. Computing device 102 additionally comprises a user interface. In various embodiments, the user interface of computing device 102 comprises a user interface for displaying image piles, for manually creating image piles, for interacting with automatically created image piles, for displaying individual images, or for any other appropriate user interface purpose.

In various embodiments, computing device 102 comprises a server, a desktop, a cloud computation processor, or any other appropriate processor. In some embodiments, images are captured from an imaging device (e.g., camera 100) and then transferred to a processor (e.g., computing device 102) to be automatically put into piles and/or efficiently displayed for a user (e.g., using a specialized index or reference number to identify images).

Figure 2A:
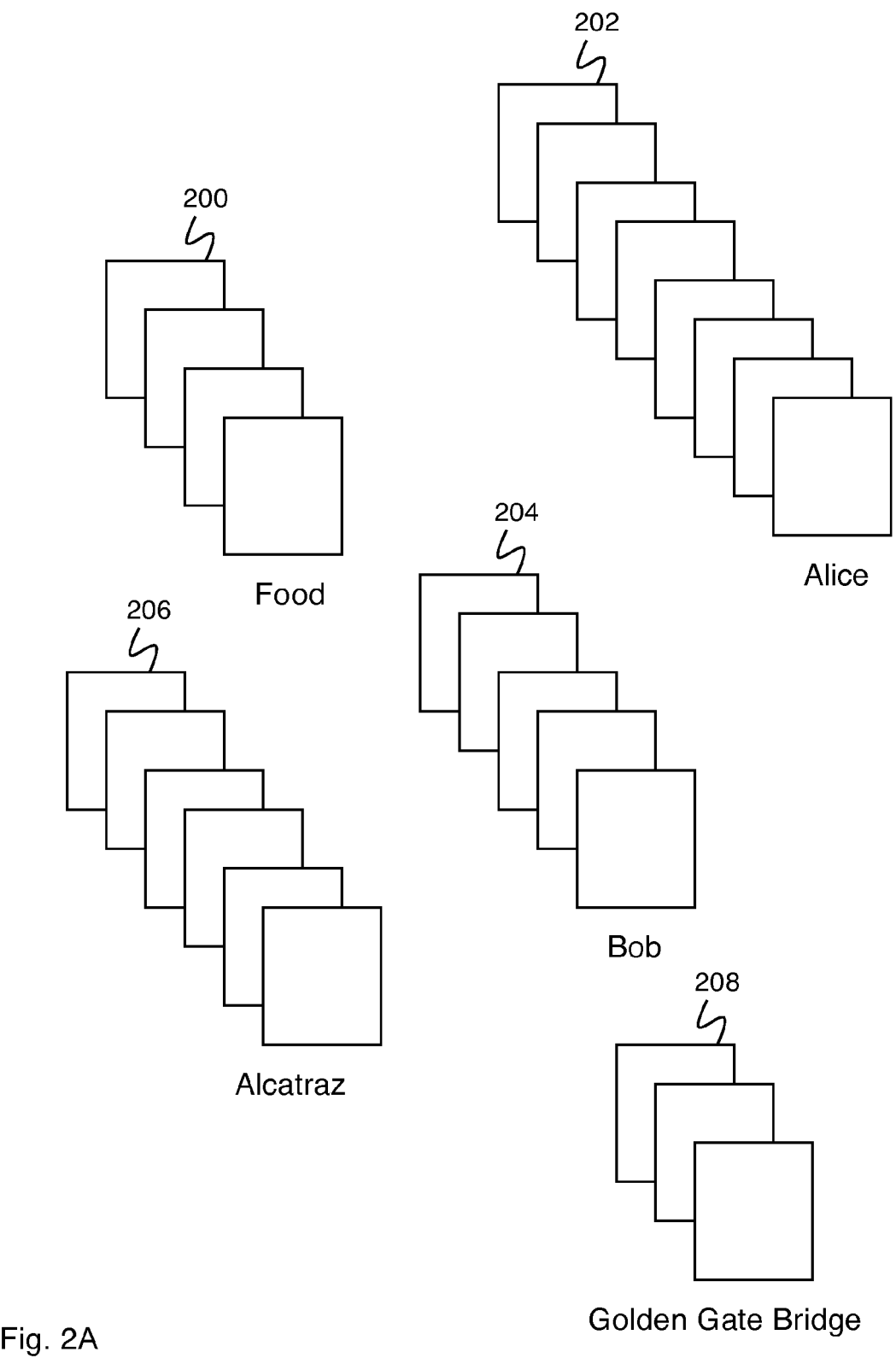
FIG. 2A is a diagram illustrating an embodiment of a set of image piles.

FIG. 2A is a diagram illustrating an embodiment of a set of image piles. In some embodiments, the image piles of FIG. 2 are determined automatically by a computing device or processor (e.g., computing device 102 of FIG. 1). In some embodiments, the image piles of FIG. 2 are determined manually by a human (e.g., by arranging images into image piles to train an automatic piler). In the example shown, pile 200 comprises images of food, pile 202 comprises images of Alice, pile 204 comprises images of Bob, pile 206 comprises images of Alcatraz, and pile 208 comprises images of the Golden Gate Bridge.

Figure 2B:
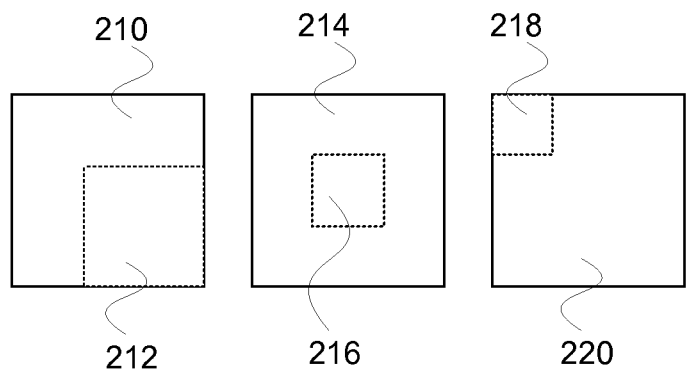
FIG. 2B is a diagram illustrating an embodiment of a pile, a stack, and a condensed stack.
Figure 2B:
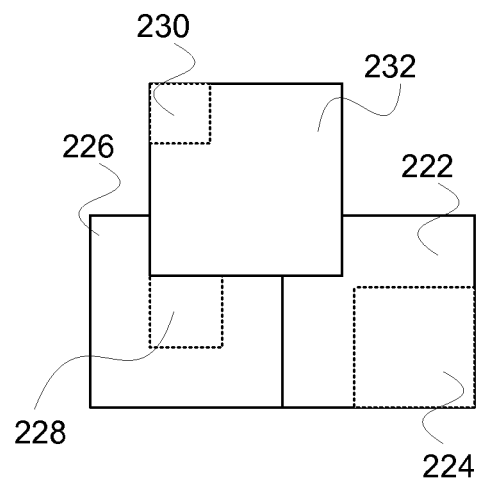
Figure 2B:
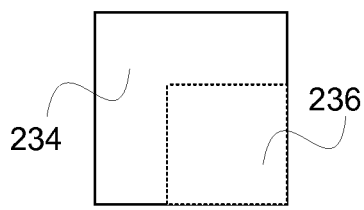
Figure 2B:
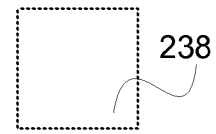

FIG. 2B is a diagram illustrating an embodiment of a pile, a stack, and a condensed stack. In the example shown, image 210, image 214, and image 218 are processed to identify important or memorable regions of the images. For example, region 212 of image 210, region 216 of image 214, and region 218 of image 220. A pile is made with image 232, image 226, and image 222 with important or memorable region 230, region 228, and region 224, respectively. The pile is constructed so that region 230, region 228, and region 224 are visible and not occluded. A stack is made with the images with maximal overlap and only one image is visible (e.g., image 234 and important or memorable region 236). A condensed stack is made where the important or memorable region 238 is displayed only. In some embodiments, a rectangle that just fits region 238 is shown.

Figure 2C:
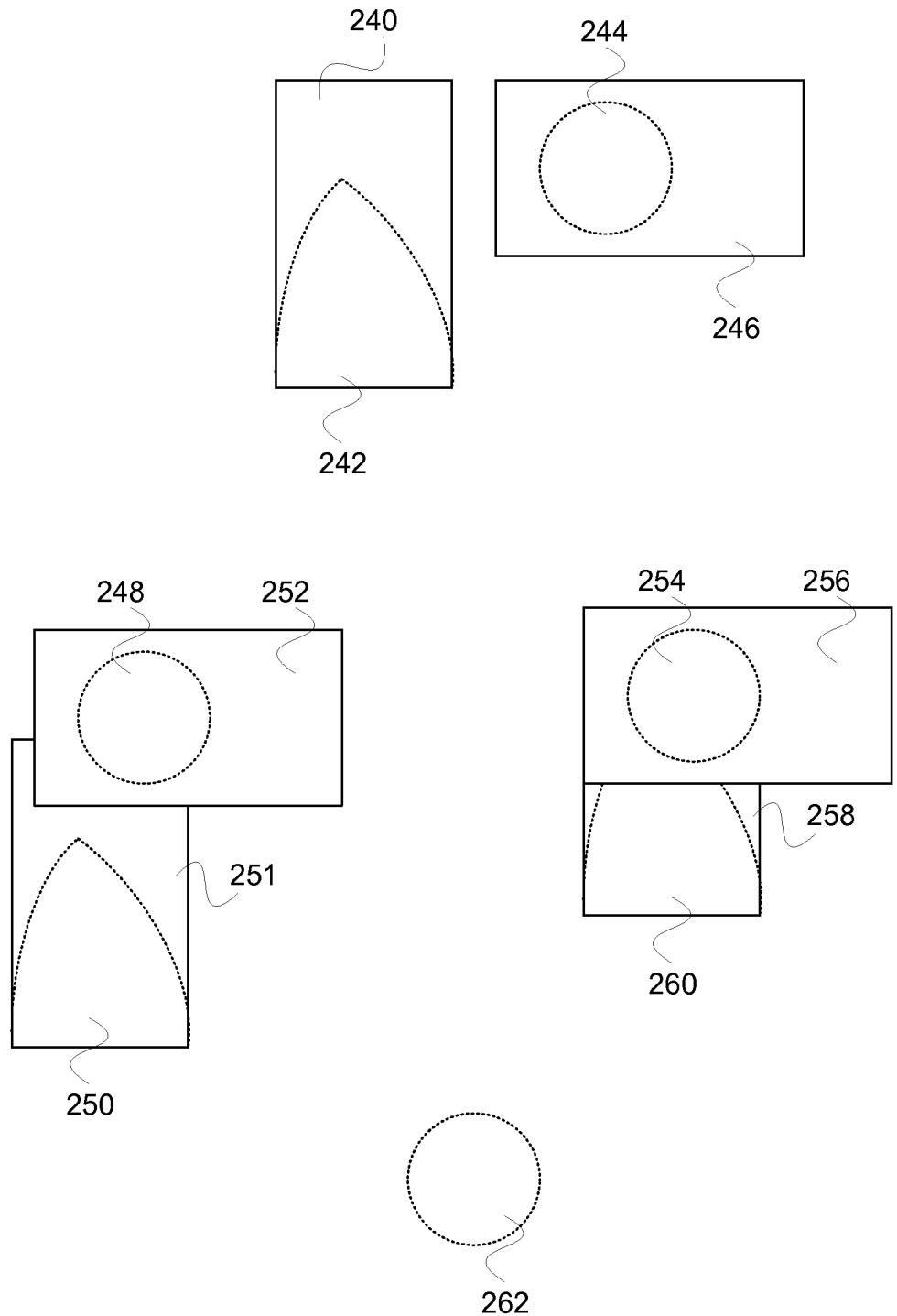
FIG. 2C is a diagram illustrating an embodiment of a pile, a stack, and a condensed stack.

FIG. 2C is a diagram illustrating an embodiment of a pile, a stack, and a condensed stack. In the example shown, image 240 and image 246 are processed to identify important or memorable regions of the images, where image 240 and image 246 have different aspect ratios. For example, region 242 of image 240 and region 244 of image 246. A pile is made with image 252 and image 251 with important or memorable region 248 and region 250, respectively. The pile is constructed so that region 248 and region 250 are visible and not occluded. A stack is made with the images with maximal overlap and only one image is visible (e.g., image 256 and important or memorable region 254 and image 258 and important and memorable region 260 that is occluded but partially visible due to different aspect ratios of the two images). A condensed stack is made visible where the important or memorable region 262 is displayed only. In some embodiments, a rectangle that just fits region 262 is shown.

Figure 3A:
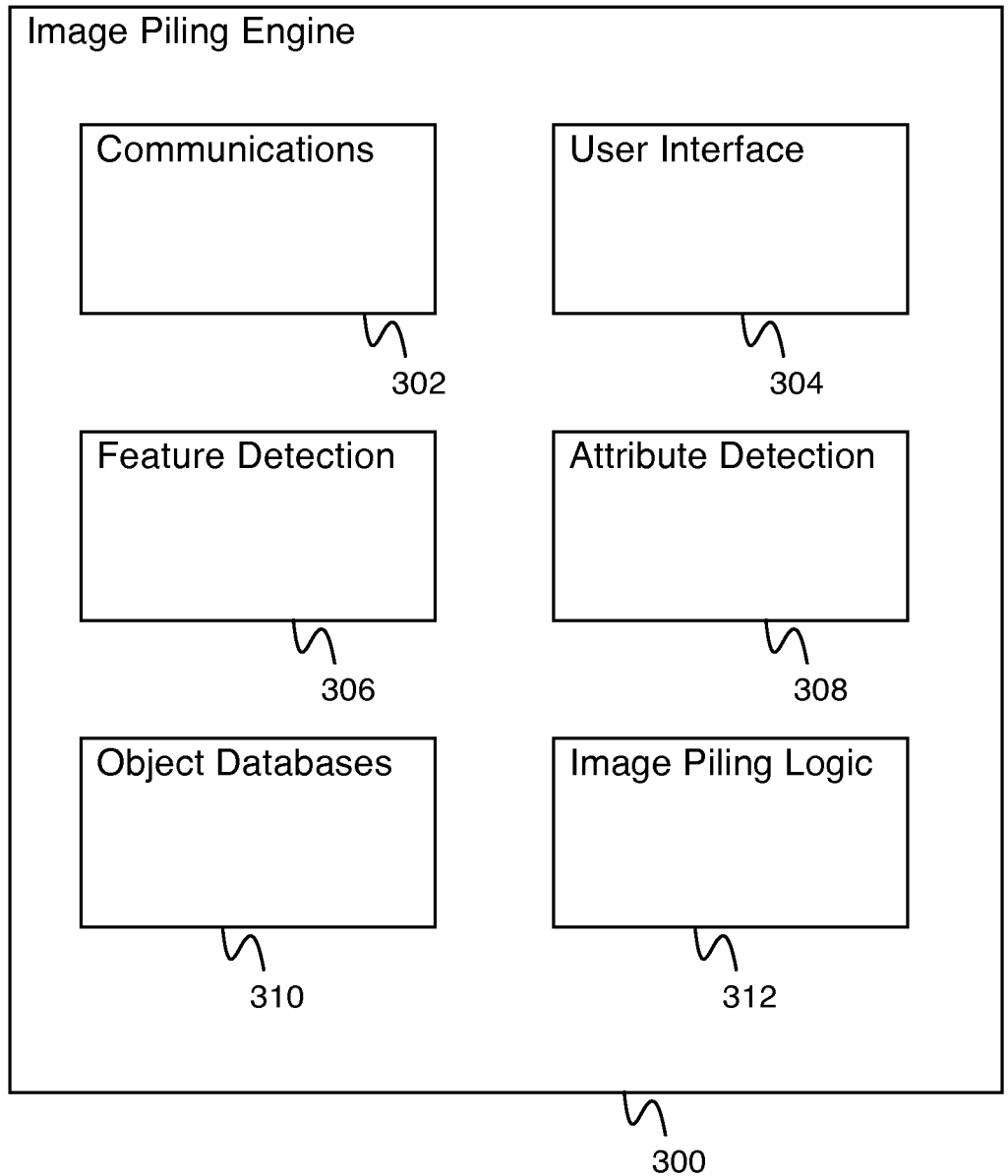
FIG. 3A is a diagram illustrating an embodiment of an image piling engine.

FIG. 3A is a diagram illustrating an embodiment of an image piling engine. In some embodiments, image piling engine 300 of FIG. 3A comprises an image piling engine running on a computing device (e.g., computing device 102 of FIG. 1). In the example shown, image piling engine 300 comprises a system for receiving a set of images and producing a set of one or more image piles. Image piling engine 300 comprises communications 302, user interface 304, feature detection 306, attribute computation 308, and image piling logic 312. Communications 302 comprises communications for receiving a set of images. In various embodiments, communications 302 comprises one or more of: a wireless data transfer interface, a wired data transfer interface, a network interface, or any other appropriate type of data transfer interface.

User interface 304 comprises a user interface for interacting with image piling engine 300. In various embodiments, user interface 304 receives commands to download images, to initiate automatic image piling, to view image piles, to modify image piles, to store image piles, to terminate a program, or any other appropriate commands. In various embodiments, user interface 304 displays images, image data, image piles, image pile data, system status information, or any other appropriate information. In some embodiments, user interface 304 comprises a graphical interface on a mobile device (e.g., a smart phone) that enables submission of images, display of images in piles that are automatically generated, display of images within piles, editing which piles the images are in, or any other appropriate graphical interface functions. For example, when a user initially begins browsing, piles of photos are shown as stacks. The stack is expanded when attended to—for example, by pointing or clicking; this expansion occurs by reducing the amount of overlap between photos in the pile, effectively spreading them out and increasing the amount of area required for their display. Expansion can occur horizontally, or vertically, or in both directions, and by any distance, either partially or wholly revealing photos in the stack. An expansion of a stack may reveal new stacks in addition to single photos. In some embodiments, on a touchscreen, a stack is expanded via the "expand" touch gesture, and, in some embodiments, an image is expanded by a "click". The fundamental actions for navigating the piles are:

1. expanding a stack
2. contracting a stack
3. enlarging a photo
4. contracting a photo
5. changing the size of the "table" (e.g., looking at a larger or smaller area of the table)
6. selecting which pile to view (e.g., photos of hiking? photos of mom?)
7. "cleaning up" the piles, to take better advantage of all available space on the table In some embodiments, the gestures available on a touch device comprise:

1. "pinch" expand
2. "pinch" contract
3. "tap"
4. double "tap"
5. swipe up
6. long press In some embodiments, the gestures available on a workstation comprise:

1. mouse hover
2. a left, middle, or right mouse click
3. bump
4. scroll up/down Feature detection 306 comprises software for detecting features in images. In some embodiments, features comprise recognizable local image regions. In various embodiments, a feature comprises an edge, a texture, a face, a logo, a symbol, a barcode, text or any other appropriate image feature. Feature detection 306 receives an image and produces a set of features for further processing. In some embodiments, features produced by feature detection 306 additionally comprise feature metadata (e.g., feature location, feature confidence, number of similar features found, or any other appropriate feature metadata).

Attribute detection 308 comprises software for detecting attributes in images. In some embodiments, image attributes comprise detectors for "has an X" relationships between an image and some X. In various embodiments, X comprises a face, an identified face, a person, text, a fruit, a product, a landmark, or any other appropriate X, including more specific forms such that indicate spatial relationships between objects, such as "has an apple next to an orange," or actions taking place between objects in the image, such as "has a man riding a horse," or hierarchical properties of the image such as "has a sign that reads Stop." Attribute detection 308 receives a set of features and produces a set of attributes. In some embodiments, attribute detection 308 additionally receives an image (e.g., the image associated with the received set of figures). In some embodiments, attributes produced by attribute detection 308 additionally comprise attribute metadata (e.g., attribute location, attribute confidence, attribute frequency, or any other attribute metadata). Attribute detection 308 utilizes object information stored in object databases 310 when detecting attributes. In various embodiments, object information stored in object databases includes features comprising an attribute, features that are present in an attribute, relative feature locations for an attribute, attribute detection algorithms, or any other appropriate object information. In some embodiments, attributes are detected in an image that are not yet stored in object databases 310 and object databases 310 are updated with the new attributes. For example, in certain cases it is possible to identify where many photos of the same "thing" have been taken (e.g., a landmark). When many photos of the same unlabeled "thing" have been taken, it can be detected, and the photos of that "thing" can be grouped without even knowing what the "thing" is. Specifically, for faces, when many faces of the same person are received, with some confidence, the faces of the same person are grouped without knowing the name of the person.

Image piling logic 312 comprises logic for determining image piles. Image piling logic 312 receives attributes from attribute detection 308 and determines one or more piles associated with the image. Piles are determined by applying a function mapping the attributes of a photo, a set of existing piles, and an ontology to a set of piles. This function may be learned from labeled data. In some embodiments, a geo-location and/or time information associated with the image is used to aid in automatically determining piles.

In various embodiments, the emphasis of grouping is changeable from grouping by time, by place, by people, by activity, or any other appropriate grouping emphasis.

Figure 3B:
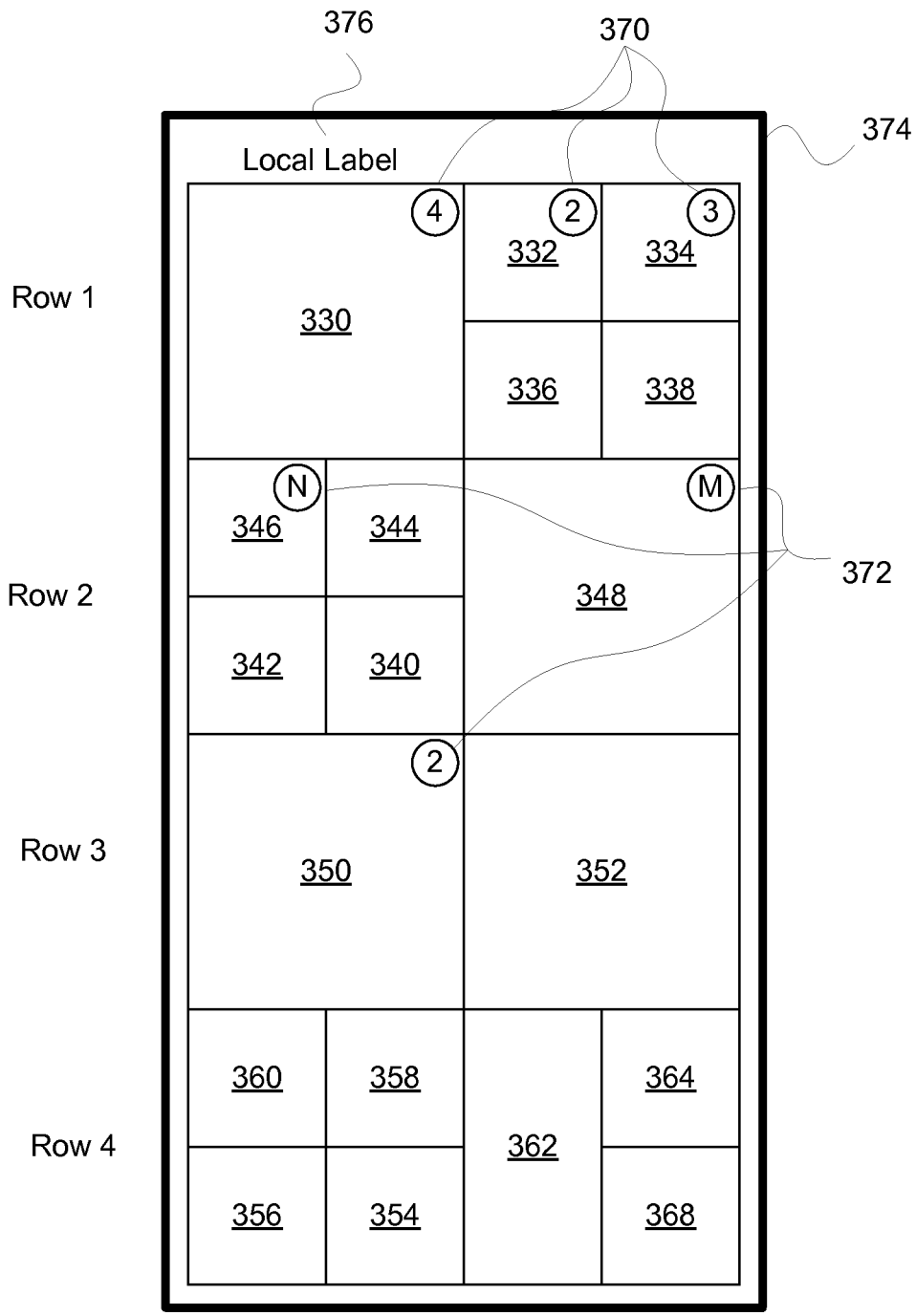
FIG. 3B is a diagram illustrating an embodiment of a display for photos.

FIG. 3B is a diagram illustrating an embodiment of a display for photos. In the example shown, a layout for images that a user sees on a display is shown. Row 1 includes a display of one large photo and 4 smaller photos (e.g., photo display space 330, 332, 334, 336, and 338). Photo display space 330 includes pile indicator 370 (e.g., 4). Photo display space 332 includes a pile indicator 370 (e.g., 2). Photo display space 334 includes a pile indicator 370 (e.g., 3). Row 2 includes a display of one large photo and 4 smaller photos (e.g., 348, 340, 342, 344, and 346). Photo display space 346 includes a pile indicator 372 (e.g., N). Photo display space 348 includes a pile indicator 372 (e.g., M). Row 3 shows two large photos (e.g., photo display space 350 and 352). Photo display space 350 includes a pile indicator 372 (e.g., 2). Row 4 shows 6 smaller photos and 1 tall photo (e.g., photo display space 354, 356, 358, 360, 364, 368, and 362). Each row is representative of a pile (e.g., a cluster of photos based for example on an attribute).

In some embodiments, the way the photos occlude each other is manipulated by dragging the edges that designate occlusion boundaries. For example, the edge shared by image 330, 332 and 336 can be dragged to the left, revealing more of images 332 and 336 and less of 330. In some embodiments, a photo is subdivided when it is selected. For example, on a touchscreen, a double tap on a photo display space with a pile indicator greater than zero splits the pile of photos into four display spaces revealing four piles of photos that lie below it in the hierarchy.

In the example shown in FIG. 3B, local label 376 is shown above the photos. In some embodiments, local label 376 comprises a date. Local label 376 shows some text that gives context relating to all the photos that are currently seen.

In some embodiments, changing the size of the table results in newly available display space. A button or gesture for "clean up", when activated, reorganizes the piles to take advantage of existing or newly available space. In some embodiments, empty space is automatically filled with piles or photos as the size of the table is changed and new display space becomes available.

Figure 3C:
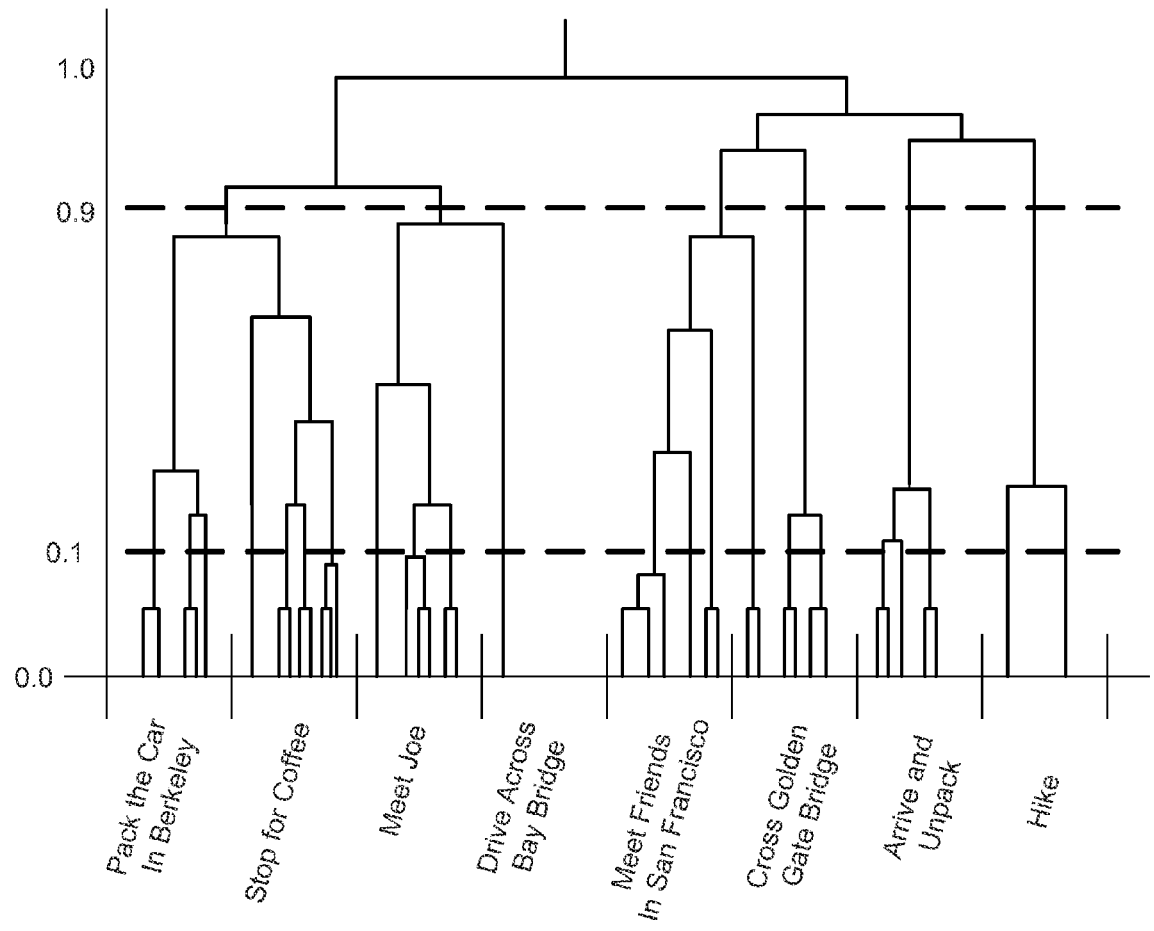
FIG. 3C is a diagram illustrating an embodiment of a time grouping of photos.

FIG. 3C is a dendrogram diagram illustrating an embodiment of a hierarchical time grouping of photos. The example shows a grouping of photos taken during a trip to hike on Muir Beach. The trip is made up of a hierarchy of piles of photos taken in bursts that occur at way-points or during sub-events along the way. In this simple example, there is no ontology, and the function designating pile memberships is learned from the set of times that the photos were taken. These times are clustered using bottom up, single link agglomerative clustering, where the similarity function is the inverse absolute difference between a pair of times. The times at which photos were taken is shown as vertical lines touching the x-axis. The value of the similarity function is indicated on the y-axis. Pairs of photos that are more similar than the value shown on the y-axis are grouped together. At any point on the y-axis, a horizontal line (a cut) can be drawn to designate a set of top-level clusters and their children. For example, at 0.1 there are 22 distinct clusters and at 0.9 there are 6. The cutting point may be determined by a number of criteria: 1) the size of the table and the display size of each pile on the table determines a number of clusters that can be visualized; 2) a prespecified level of similarity; 3) where the gap between two successive combination of similarities is largest (such gaps arguably indicate "natural" clusterings); or 4) any other appropriate criteria. Other similarity functions, besides distances in time, can be used to determine clusters—for example, a path length along the edges in an ontological graph of "is a" relationships. In some embodiments, a "place" sense is used for clustering—for example, one photo is labeled "beach", another "Muir beach", and another "Golden Gate Bridge". In this case, it can be computed from the ontology that beach and Muir beach are more closely related than beach and Golden Gate Bridge. In some embodiments, a relationship other than "is a" is used such as "brother", "sister", "mother", "friend", etc. In various embodiments, ways to organize are "time", "person", "place", "activity", or any other appropriate manner.

In some embodiments, switching organizational senses is like moving from one "table" to another (e.g., switching is activated using a swipe with four fingers and it looks like "the page is turning" to a different set of piles). In some embodiments, moving around the table is achieved by dragging with one finger around on a touch sensitive display. In some embodiments, zooming in and out by closing two fingers towards each other (e.g., pinching) and opening two fingers away from each other.

In some embodiments, changing how photos are occluding each other is done by dragging a photo with two fingers out from under a photo. In some embodiments, a border of a photo is held down until it is high-lighted and the photo is brought to the top of a pile. In some embodiments, tables are switch is flipped by moving three fingers on the touch sensitive display. In some embodiments, tapping twice on any photo with a number greater than one in the upper right hand corner subdivides it into four piles and zooms in a little (perhaps as much as one column width).

Figure 4:
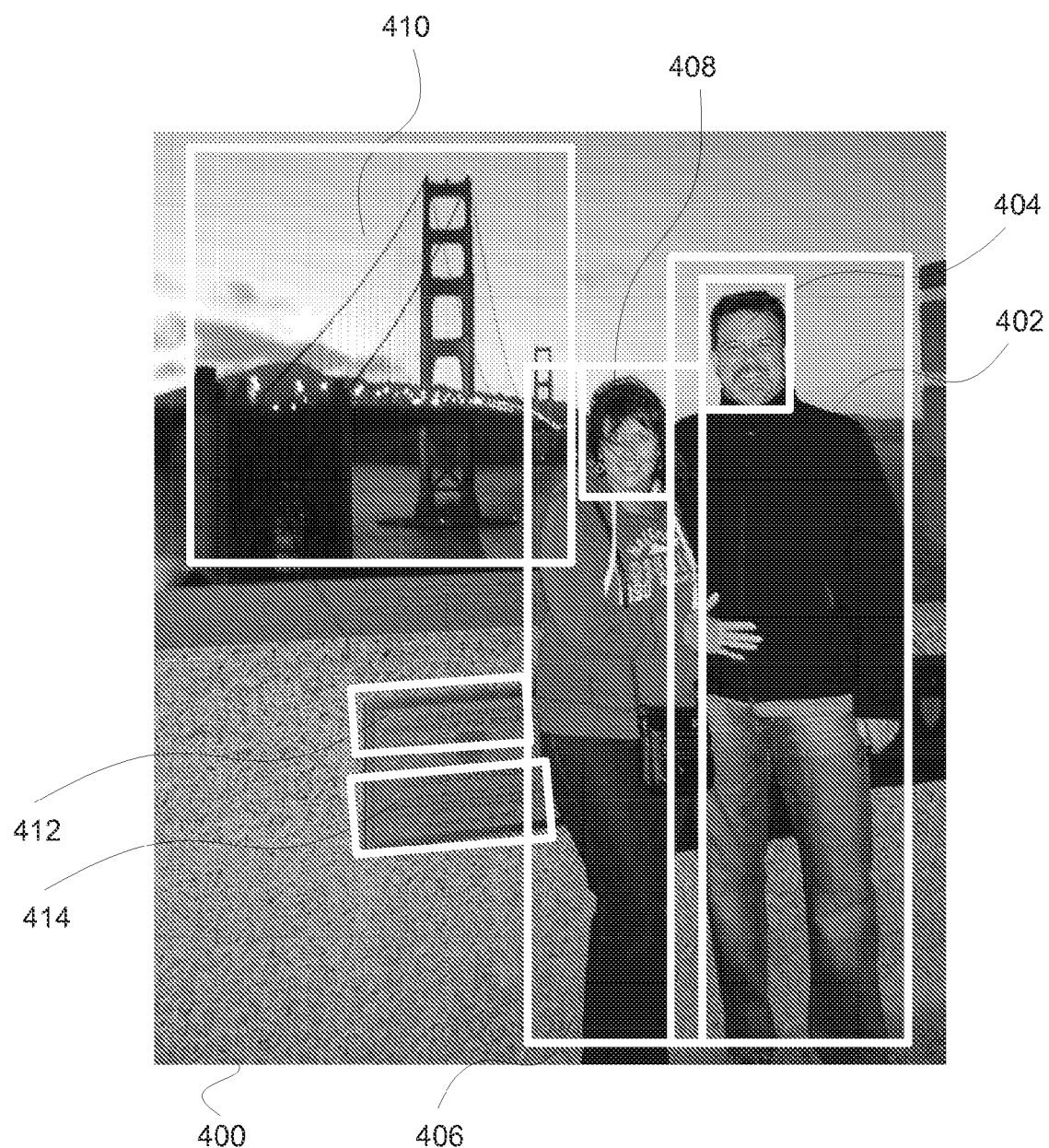
FIG. 4 is a diagram illustrating an embodiment of the relationship between objects and attributes.

FIG. 4 is a diagram illustrating an embodiment of the relationship between objects and attributes. In the example shown, image 400 is analyzed to determine objects and attributes associated with image 400. For example, the scene within image 400 is determined to have a 0.9 probability of having the attribute sunset, 0.0 probability of having the attribute beach, 0 probability of having attribute snow, and 0.2 probability of having attribute mountain. Object 402 is determined to have 0.9 probability of being a person and a location within image 400. Object 404 is determined to have 0.95 probability of being a face and a location within image 400. Object 406 is determined to have 0.8 probability of being a person and a location within image 400. Object 408 is determined to have 0.95 probability of being a face, 0.9 probability of having an identity name of 'Jessica Smith' and a location within image 400. Object 410 is determined to have 1.0 probability of being a landmark with a name of 'Golden Gate Bridge.' Object 412 is determined to be text with a location within image 400. Object 414 is determined to be text with a location within image 400 and 0.9 probability of having transcription 'Golden Gate Bridge.'

Figure 5:
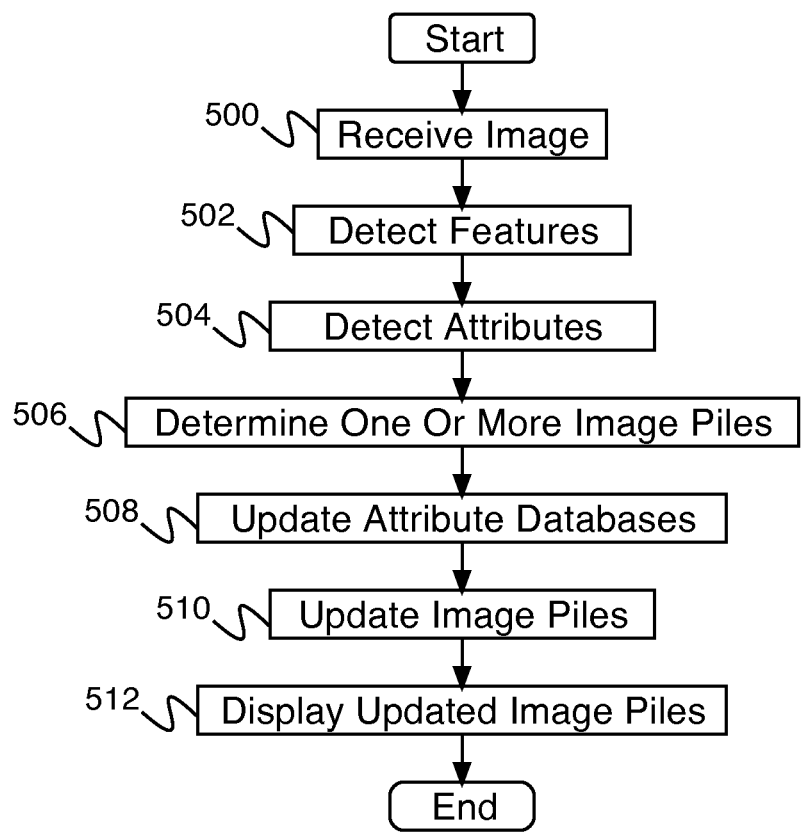
FIG. 5 is a flow diagram illustrating an embodiment of a process for determining piles.

FIG. 5 is a flow diagram illustrating an embodiment of a process for determining piles. In some embodiments, the process of FIG. 5 is executed by image piling engine 300 of FIG. 3A. In the example shown, the process of FIG. 5 is used to update or determine one or more image piles in response to received image(s). In 500, an image is received. In 502, image features are detected. In 504, image attributes are detected. In 506, one or more image piles (e.g., one or more image piles to be associated with the received image) are determined. In 508, attribute databases are updated. In some embodiments, attribute databases are updated only if necessary. In 510, image piles are updated. In some embodiments, updating image piles comprises adding the received image to the appropriate image piles. In some embodiments, updating image piles comprises determining a new image pile ordering. In some embodiments, updating image piles comprises determining a new top image for the image piles. In 512, updated image piles are displayed.

In some embodiments, important/memorable areas of images in a pile are viewable and not covered up. In some embodiments, an attribute of an image is a ranking that is used to determine relative importance. In some embodiments, the most important images (e.g., the highest ranking) are displayed in a viewable manner. In some embodiments, the important areas of the most important photos are displayed in a viewable manner.

In some embodiments, features are computed over different sized windows. In some embodiments, features are detected using scanning windows.

Figure 6:
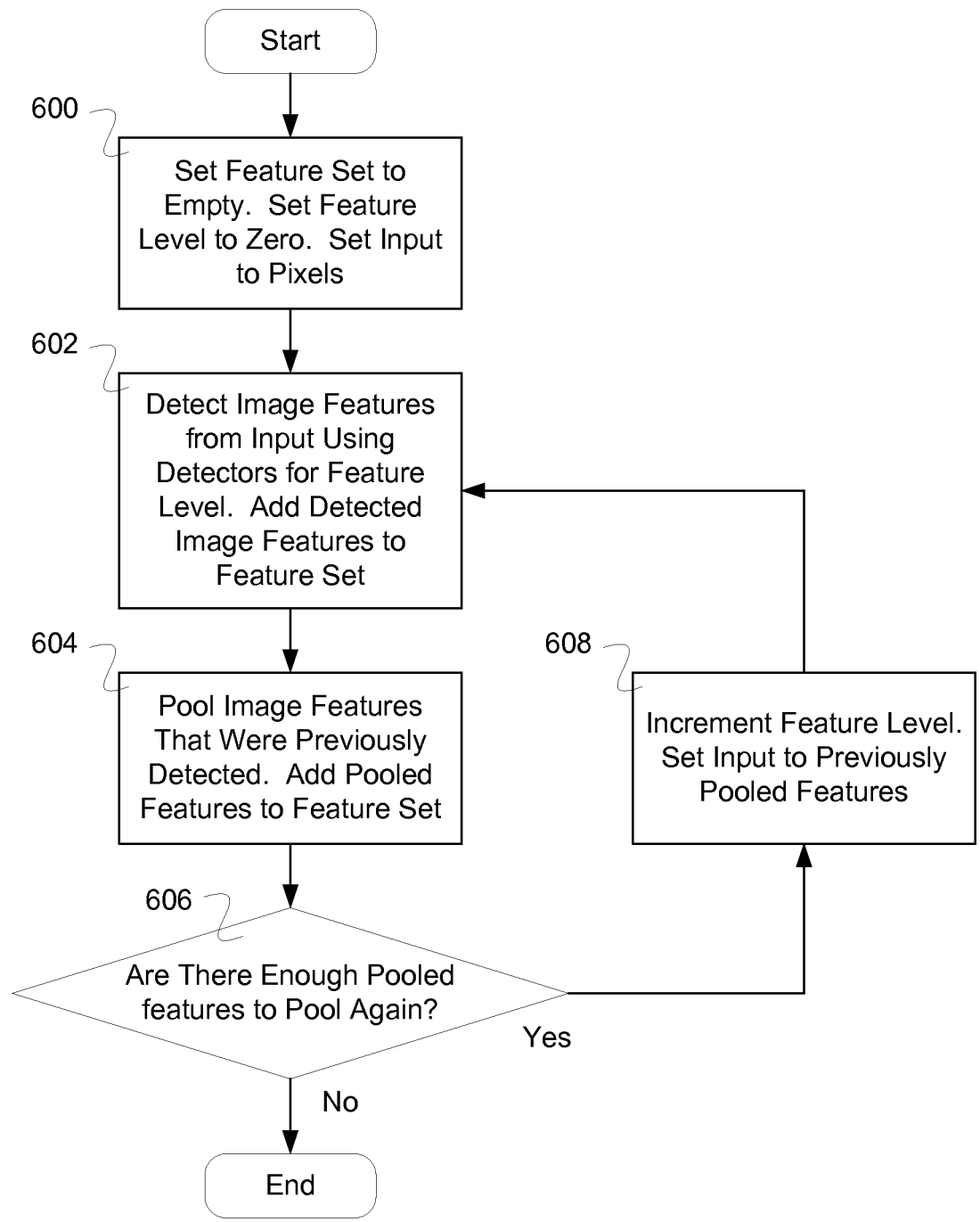
FIG. 6 is a flow diagram illustrating an embodiment of a process for detecting features.

FIG. 6 is a flow diagram illustrating an embodiment of a process for detecting features. In the example shown, in 600 a feature set is set to empty. A feature level is set to zero. An input to pixel is set. In 602, image features are detected from input using detectors for feature set. Detected image features are added to feature set. In 604, image features are pooled that were previously detected. Pooled features are added to feature set. In 606, it is determined whether there are enough pooled features to pool again. In the event that there are enough pooled features to pool again, then in 608 the feature level is incremented, the input is set to previously pooled features, and control is passed to 602. In the event that there are not enough pooled features to pool again, then the process ends.

Figure 7:
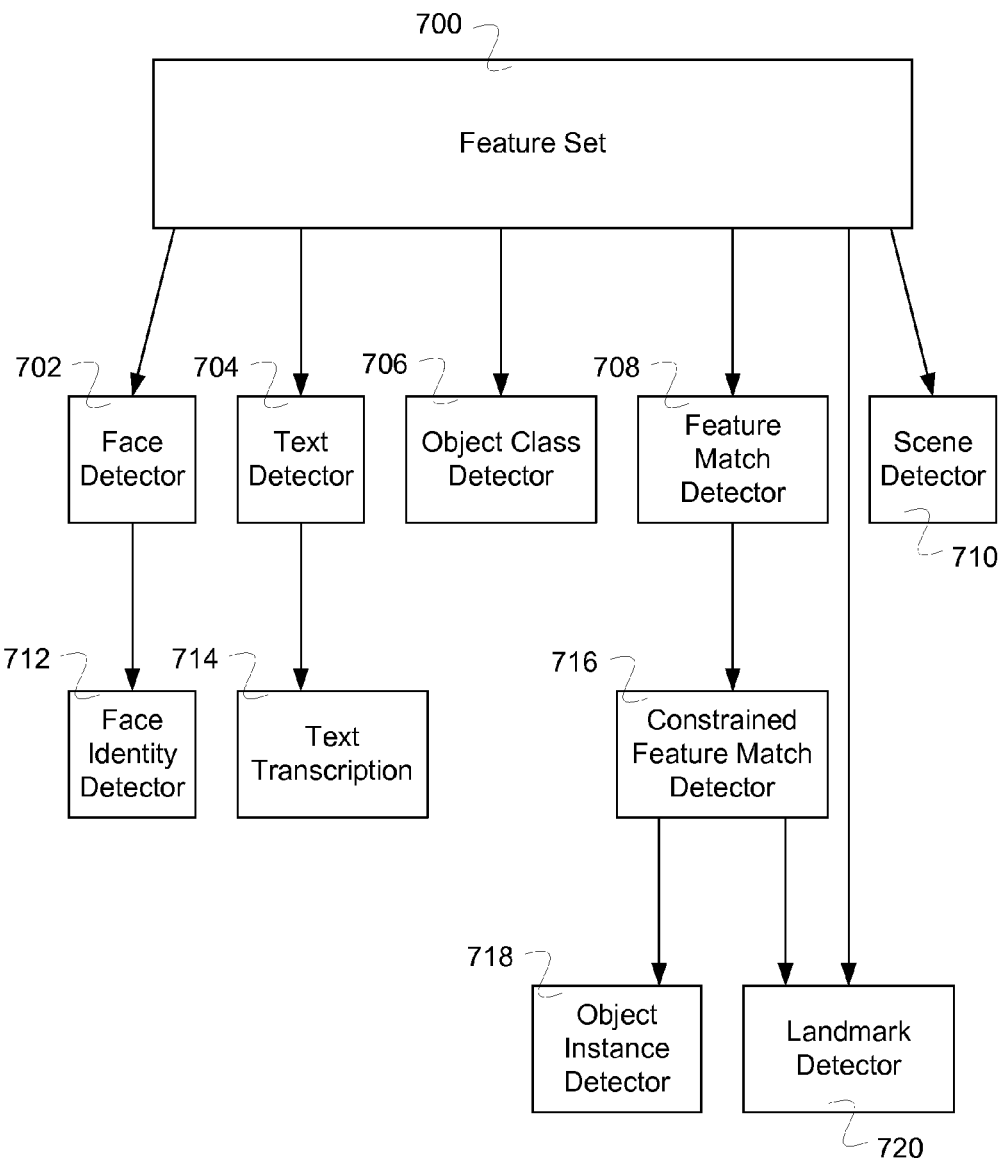
FIG. 7 is a block diagram illustrating an embodiment of attribute detection.

FIG. 7 is a block diagram illustrating an embodiment of attribute detection. In some embodiments, the block diagram of FIG. 7 is used by attribute detection 308 of FIG. 3A to detect attributes from features. In the example shown, attribute detection begins with feature set 700. Feature set 700 is provided to face detector 702, text detector 704, object class detector 706, feature match detector 708, and scene detector 710. Face detector 702 processes the feature set and determines whether a face or faces are present. If face detector 702 determines that a face or faces are present, face attribute(s) is/are stored along with confidence factors, locations, and any other appropriate attribute metadata. Any determined face attributes are provided to face identity detector 712. Face identity detector 712 determines any appropriate face identity attributes and stores any determined face identity attributes associated with the face attributes. Text detector 704 processes feature set 700 and determines if text is present. If text detector 704 determines that text is present, a text attribute is stored, along with a confidence factor, a location, and any other appropriate attribute metadata. Any determined text attributes are provided to text transcription 714. Text transcription 714 determines transcribed text values wherever possible and stores any determined transcribed text values associated with the text attributes.

Object class detector 706 detects whether an instance or instances of a local object class are present. In some embodiments, instances of an object class comprise a set of image features that have correspondence and/or a statistical correlation to a set of image features in a set of labeled database images corresponding to the object class. For instance, an object class could be a chair, a car, a cup, a pair of sunglasses, or a table. If object class detector 706 determines that an instance or instances of an object class are present, object class attributes are stored, along with confidence factors, locations, and any other appropriate attribute metadata. Feature match detector 708 detects whether features match features associated with a known attribute. If feature match detector 708 determines that features match features associated with a known attribute, feature match attributes are stored, along with confidence factors, locations, and any other appropriate attribute metadata. Any determined feature match attributes are provided to constrained feature match detector 716. Constrained feature match detector 716 provides constraints to feature matches found by feature match detector 708. In some embodiments, constrained feature match detector 716 provides homographic constraints to feature matches. In some embodiments, a homographic constraint on a feature match comprises a geometric transformation from the set of local features to the matching set of features. If constrained feature match detector 716 determines that features match when subject to constraints, constrained feature match attributes are stored, along with confidence factors, locations, and any other appropriate attribute metadata. Any constrained feature matches found are provided to object instance detector 718. Object instance detector 718 detects whether constrained feature matches found by constrained feature match detector 716 comprise object instances. For instance, object instances comprise the cover art for a particular book, a movie poster, a page from a magazine, the packaging of a product, or a currency bill. If object instance detector 718 determines that object instances are detected, object instances are stored, along with confidence factors, locations, and any other appropriate metadata.

Constrained feature matches found by constrained feature match detector 716 and feature set 700 are provided to landmark detector 720. Landmark detector 720 detects landmark attributes from constrained feature match detector 716 and feature set 700. Landmark attributes comprise descriptions of well-known physical objects or locations. If landmark detector 720 determines that a landmark is detected, landmark attributes are stored, along with confidence factors, locations, and any other appropriate metadata. Feature set 700 is additionally provided to scene detector 710. Scene detector 710 determines the overall scene attribute of an image. For instance, scene attributes comprise night, day, indoors, outdoors, ocean, desert, or any other appropriate scene attribute. Scene detector 710 stores any detected scene attribute, along with confidence factor, fraction of image occupied by the scene, or any other appropriate metadata. In some embodiments, any other appropriate attribute detectors are included in the attribute detection system of FIG. 7.

In the example shown, the flow of the image attribute computation algorithm is as follows: First, a set of features is computed from the image. Such a computation may occur at one frequency band (e.g., for a grayscale image), or at multiple frequency bands (for a color image). In conjunction with labeled training data, these features are used to form models of objects and image categories. The labels may describe the visual representation of an object or category by a collection of 2-dimensional views and contours demarcating a sub-region of each image. It is useful to distinguish between training images, which are a limited set of images that have been annotated with noisy labels by humans, and input data, for which attributes are computed entirely by a machine in conjunction with the models. In both cases, the same sets of features are used. The models are computed from the features in the training images, then applied to the input images to compute attributes. Some attribute models may utilize other attributes in addition to the sets of features. For example, the "portrait" attribute may use the face detector attribute.

Figure 8:
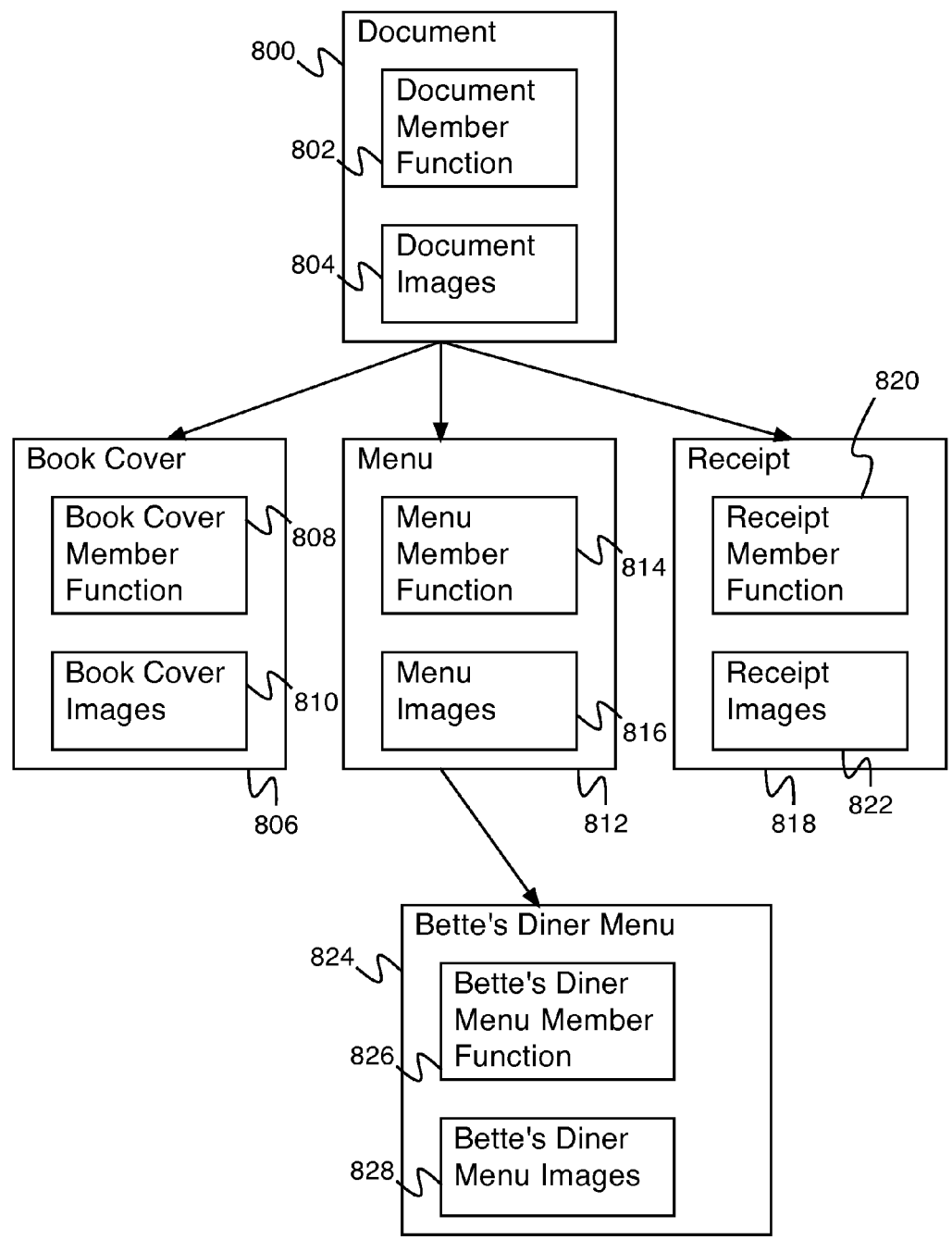
FIG. 8 is a block diagram illustrating an embodiment of a hierarchy for determining a pile.

FIG. 8 is a block diagram illustrating an embodiment of a hierarchy for determining a pile. In some embodiments, a hierarchy for determining a pile is used by image piling logic 312 for determining a pile from a set of attributes. The hierarchy of FIG. 8 receives an image with an associated set of attributes and determines a pile or piles. In the example shown, the hierarchy of FIG. 8 comprises document element 800, book cover element 806, menu element 812, receipt element 818, and Bette's Diner menu 824. Each element comprises an associated member function and images. When an image and associated image attributes are received by the hierarchy, it is determined whether the image is a member of the top element (e.g., document element 800), using the member function of the top element (e.g., document member function 802). In some embodiments, the member function determines whether the image is a member of the element using the image attributes. In some embodiments, the member function determines whether the image is a member of the element using a combination of the image and the image attributes. If the member function determines that the image is a member of the element, the image is added to the element images set (e.g., document images 804). It is then determined whether the image is a member of any of the children of the top element (e.g., book cover element 806, menu element 812, or receipt element 818), using the appropriate member functions (e.g., book cover member function 808, menu member function 814, or receipt member function 820). An image proceeds down the hierarchy in this way until the set of elements in the hierarchy that the image is a member of is determined. Once the set of elements in the hierarchy that the image is a member of is determined, it is determined which of these elements are piles for the image. In various embodiments, all of the elements are piles for the image, the elements that are piles are determined from the number of other images that are members of each element (e.g., the process tries to create a small number of piles, the process tries to create a large number of piles, etc.), the elements that are piles are determined from the element position in the hierarchy (e.g., only the lowest element in the hierarchy is a pile, the lowest element of each branch is a pile, etc.), or the elements that are piles are determined in any other appropriate way. In some embodiments, if the image is determined to be a member of a hierarchy element using a member function, and is associated with an image already stored in the image set of that element, a new child element is created. The new child element represents the object found in both the new image and the associated image. In some embodiments, the hierarchy of FIG. 8 comprises one of a set of hierarchies, each for assigning an image in a different image recognition category (e.g., documents, food, landmarks, furniture, etc.).

Figure 9:
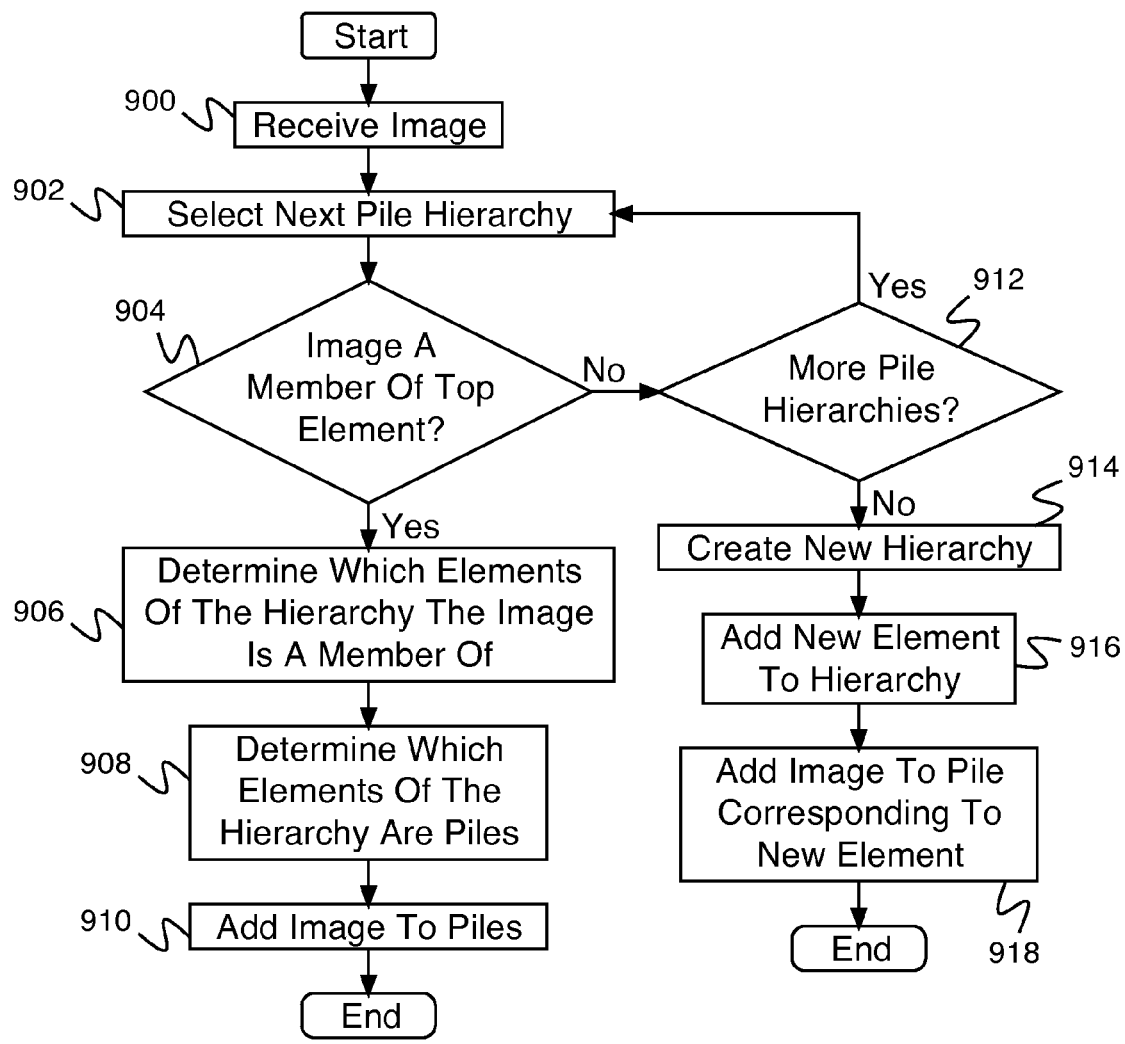
FIG. 9 is a flow diagram illustrating an embodiment of a process for automatic image piling.

FIG. 9 is a flow diagram illustrating an embodiment of a process for automatic image piling. The process of FIG. 9 comprises a process for determining piles. In some embodiments, the process of FIG. 9 is executed by image piling engine 300 of FIG. 3A. In the example shown, in 900, an image is received. In various embodiments, an image is received from a camera, a storage device, a network, a wired connection, a wireless connection, a software image synthesizer, or any other appropriate image source. In 902, the next pile hierarchy is selected. In some embodiments, the next pile hierarchy comprises the first pile hierarchy. In some embodiments, the next pile hierarchy comprises the hierarchy of FIG. 8. In 904, it is determined whether the image is a member of the top element (e.g., a member of the top element of the hierarchy). In some embodiments, it is determined whether the image is a member of the top element using the member function of the top element. If it is determined in 904 that the image is a member of the top element, control passes to 906. In 906, it is determined which elements of the hierarchy the image is a member of In some embodiments, determining which elements of the hierarchy the image is a member of comprises testing the image using the member function of each element of the hierarchy. In some embodiments, determining which elements of the hierarchy the image is a member of comprises proceeding down the hierarchy from the top element and testing the image using the member function of an element of the hierarchy if the image is determined to be a member of the parent of the element. In 908, it is determined which elements of the hierarchy are piles. In various embodiments, all elements of the hierarchy the image is a member of are determined to be piles, a subset of the elements of the hierarchy the image is a member of are determined to be piles, a single element of the hierarchy the image is a member of is determined to be a pile, or any other appropriate number of elements of the hierarchy are determined to be piles. In some embodiments, an element or elements of the hierarchy are determined to be piles based at least in part on the position of the element or elements in the hierarchy. In 910, the image is added to the piles.

If it is determined in 904 that the image is not a member of the top element, control passes to 912. In 912, it is determined whether there are more pile hierarchies. If it is determined that there are more pile hierarchies, control passes to 902. If it is determined that there are not more pile hierarchies, control passes to 914. In 914, a new hierarchy is created. In 916, a new element is added to the hierarchy (e.g., to the hierarchy created in 914). In 918, the image is added to the pile corresponding to the new element.

Figure 10:
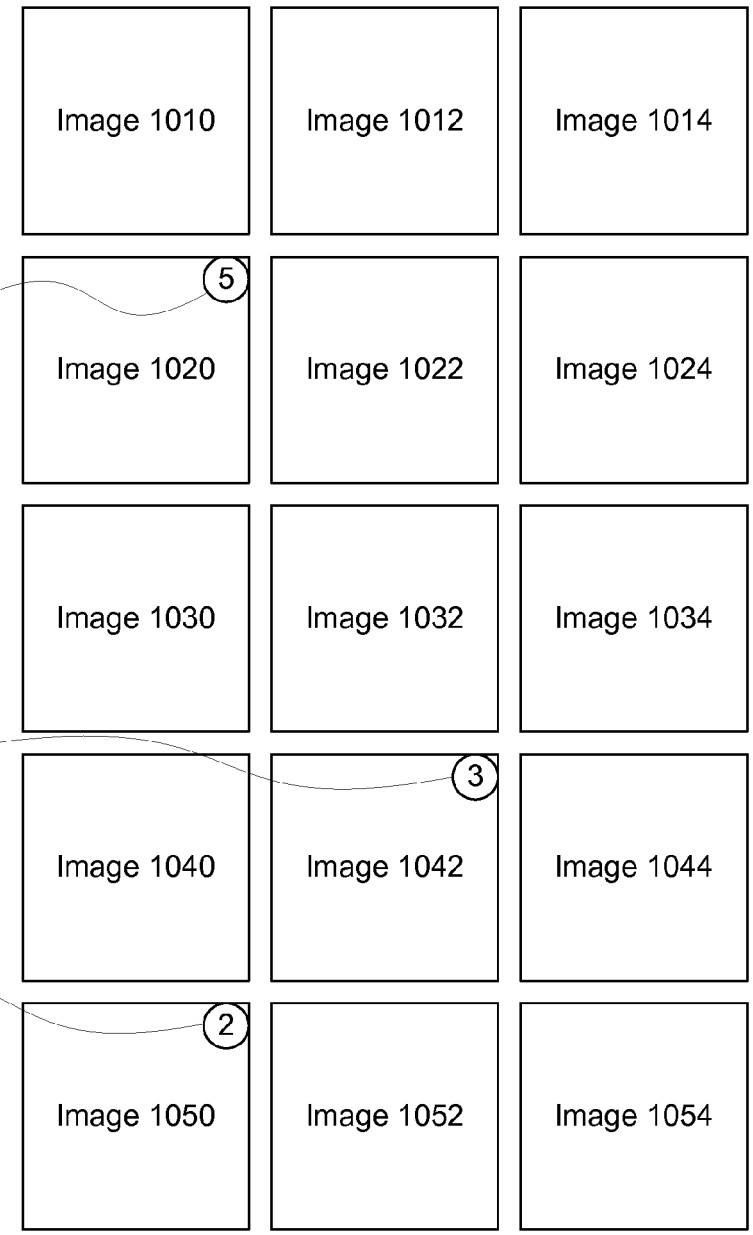
FIG. 10 is a diagram illustrating an embodiment of a display for a smart album.

FIG. 10 is a diagram illustrating an embodiment of a display for a smart album. In the example shown, a display of a smart album includes a list of filters (e.g., text filter 1000) and a display of photos (e.g., image 1010, image 1012, image 1014, image 1020, image 1022, image 1024, image 1030, image 1032, image 1034, image 1040, image 1042, image 1044, image 1050, image 1052, and image 1054). The photos can be filtered by selecting a tag to filter by and pushing submit. The photos have been automatically tagged and these tags are listed for filtering. Similar photos are piled together to save display space. Indicators (e.g., indicator 1002, indicator 1004, and indicator 1006) indicate similar photos exist in the display pile. For example, image 1020 is one of 5 photos in the pile. In some embodiments, clicking on the indicator expands the display of the photos in the pile. For another example, indicator 1004 indicates that image 1042 is one of 3 photos in a pile. For another example, indicator 1006 indicates that image 1050 is one of 2 photos in a pile.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to receive an image;
a processor and a memory, at least one of the processor or the memory being configured to:
  determine one or more attributes of the image;
  classify the image by determining a set of elements of a hierarchy of which the image is a member based at least in part on the attributes;
  adding the image to one or more piles associated with the set of elements of the hierarchy of which the image is a member; and
  providing at least one pile associated with the hierarchy for presentation via a display, the pile including one or more images.

2. The system of claim 1, wherein at least one of the processor or the memory is further configured to determine features of the image, wherein the attributes are determined based at least in part on the features.

3. The system of claim 1, wherein the hierarchy is one of a plurality of hierarchies.

4. The system of claim 3, wherein the plurality of hierarchies comprises an initial set of hierarchies.

5. The system of claim 1, wherein the set of elements of the hierarchy comprise element member functions, wherein each of the element member functions determines whether the image is a member of the corresponding one of the set of elements.

6. The system of claim 1, wherein at least one of the processor or the memory is further configured to add a new element to the hierarchy.

7. The system of claim 1, wherein the at least one of the processor of the memory is further configured to create a new hierarchy in the event that the image is determined to not be a member of a top element of the hierarchy.

8. The system of claim 1, wherein the set of elements of the hierarchy the image is a member of is determined by checking elements of the hierarchy in top down order.

9. The system of claim 8, wherein at least one of the processor or the memory is further configured to determine whether the image is a member of a child of an element in the hierarchy of which the image is a member.

10. The system of claim 1, wherein it is determined which of the elements of the set of elements of the hierarchy are piles based at least in part on the number of images associated with each element.

11. The system of claim 1, wherein it is determined which of the elements of the set of elements the image is a member of are piles based at least in part on an element position in the hierarchy.

12. The system of claim 11, wherein an element the image is a member of furthest down in the hierarchy is determined to be a pile to which the image is added.

13. A method, comprising:
   determining, using a processor, attributes of an image;
   classifying the image by determining a set of elements of a hierarchy of which the image is a member based at least in part on the attributes;
   adding the image to one or more piles associated with the set of elements of the hierarchy of which the image is a member; and
   providing at least one pile associated with the hierarchy for presentation via a display, the pile including one or more images.

14. A computer program product, the computer program product being embodied in a non-transitory computer readable storage medium and comprising computer instructions for:
   determining attributes of an image;
   classifying the image by determining a set of elements of a hierarchy of which the image is a member based at least in part on the attributes;
   adding the image to one or more piles associated with the set of elements of the hierarchy of which the image is a member; and
   providing at least one pile associated with the hierarchy for presentation via a display, the pile including one or more images.

15. The method of claim 13, further comprising:
   determining important portions of the images in the pile;
   wherein the pile is provided such that at least a subset of the important portions of the images in the pile are visible.

16. The system of claim 1, wherein the pile comprises a plurality of images sharing a set of attributes.

17. The system of claim 1, wherein the attributes of the image comprise at least one of a location at which the image was taken, a predominant color of the image, an object that is featured in the image, or a type of object that is featured in the image.

18. The system of claim 1, wherein the hierarchy is represented via a graph comprising a plurality of nodes connected by edges that indicate relationships among the plurality of nodes.

19. The method of claim 13, wherein determining a set of elements of a hierarchy of which the image is a member based at least in part on the attributes comprises:
   automatically determining a set of piles associated with the image based at least in part on the attributes of the image;
   wherein adding the image to one or more piles includes adding the image to the set of piles.

20. The method of claim 13, wherein the set of elements comprises one or more classes.

* * * * *